United States Patent
Kato et al.

(10) Patent No.: US 12,009,124 B2
(45) Date of Patent: Jun. 11, 2024

(54) FIXING STRUCTURE OF WIRING MEMBER, AND WIRING MEMBER WITH HEAT GENERATION LAYER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hirotaka Kato, Mie (JP); Hiroki Hirai, Mie (JP); Makoto Higashikozono, Mie (JP); Kosuke Sone, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 234 days.

(21) Appl. No.: 17/768,350

(22) PCT Filed: Aug. 21, 2020

(86) PCT No.: PCT/JP2020/031604
§ 371 (c)(1),
(2) Date: Apr. 12, 2022

(87) PCT Pub. No.: WO2021/084861
PCT Pub. Date: May 6, 2021

(65) Prior Publication Data
US 2023/0024015 A1    Jan. 26, 2023

(30) Foreign Application Priority Data
Oct. 28, 2019 (JP) ................. 2019-194980

(51) Int. Cl.
*H01B 7/40* (2006.01)
*B60R 16/02* (2006.01)
(Continued)

(52) U.S. Cl.
CPC ........... *H01B 7/40* (2013.01); *B60R 16/0215* (2013.01); *H02G 3/305* (2013.01); *H05B 6/10* (2013.01)

(58) Field of Classification Search
CPC ........ H02G 3/30; H02G 3/0456; H02G 3/305; B60R 16/0215; H01B 7/40; H05B 6/10
(Continued)

(56) References Cited

U.S. PATENT DOCUMENTS 4,413,656 A * 11/1983 Pithouse ............ H02G 15/1813
174/DIG. 8
4,759,811 A * 7/1988 Jensen ................ B29C 61/0625
174/12 R
(Continued)

FOREIGN PATENT DOCUMENTS

JP S52-111681 A 9/1977
JP 64-71017 3/1983
(Continued)

OTHER PUBLICATIONS

Office Action, Japan Patent Office, in counterpart Japanese Patent Application No. 2019-194980, dated Jan. 31, 2023, with English translation.

(Continued)

*Primary Examiner* — Timothy J Thompson
*Assistant Examiner* — Michael F McAllister
(74) *Attorney, Agent, or Firm* — GREENBLUM & BERNSTEIN, P.L.C.

(57) ABSTRACT

A fixing structure of a wiring member includes: a wiring member including at least one wire-like transmission mem-
(Continued)

ber; a heat generation layer provided to surround a periphery of the wiring member; an adherend to which the wiring member is fixed; and a joint layer provided on at least a portion between the heat generation layer and the adherend and a portion between the heat generation layer and the wiring member, wherein the heat generation layer is a layer which can generate heat by induction heating, the joint layer is a layer having bond properties by heat transmitted from the heat generation layer at a time of induction heating, and is joined to the heat generation layer and at least one of the adherend and the wiring member.

6 Claims, 3 Drawing Sheets

(51) Int. Cl.
  *H02G 3/30* (2006.01)
  *H05B 6/10* (2006.01)
(58) Field of Classification Search
  USPC ....................................................... 174/110 R
  See application file for complete search history.

(56) References Cited

U.S. PATENT DOCUMENTS

| | | | | |
|---|---|---|---|---|
| 4,896,000 | A * | 1/1990 | Procter | ............ H01R 13/65912 |
| | | | | 174/75 C |
| 5,642,852 | A * | 7/1997 | Suzuki | .................. B23K 20/10 |
| | | | | 228/110.1 |
| 2002/0117321 | A1* | 8/2002 | Beebe | ................. B60R 16/0215 |
| | | | | 174/72 A |
| 2008/0190661 | A1* | 8/2008 | O'Brien | ............. B60R 16/0215 |
| | | | | 174/72 A |
| 2009/0133927 | A1* | 5/2009 | Onuma | .................... H01R 4/20 |
| | | | | 174/84 C |
| 2014/0124261 | A1* | 5/2014 | Mizuhira | ............ B60R 16/0215 |
| | | | | 174/110 R |
| 2015/0020956 | A1* | 1/2015 | Larson | ............... H01B 11/1895 |
| | | | | 428/189 |
| 2016/0039367 | A1* | 2/2016 | Yoshida | .................... H02G 3/24 |
| | | | | 29/525.01 |
| 2017/0135416 | A1* | 5/2017 | Kang | .................. A41D 19/0024 |
| 2019/0245333 | A1* | 8/2019 | Kawakami | ........... H01B 7/0045 |
| 2020/0172027 | A1 | 6/2020 | Mizuno et al. | |

FOREIGN PATENT DOCUMENTS

| | | |
|---|---|---|
| JP | S59-165314 A | 9/1984 |
| JP | S61-047080 A | 3/1986 |
| JP | 4-19920 | 1/1992 |
| JP | 4-19920 X | 1/1992 |
| JP | H11-196521 A | 7/1999 |
| JP | 2000-264137 A | 9/2000 |
| JP | 2002-371253 A | 12/2002 |
| JP | 2006-049307 A | 2/2006 |
| WO | 2018/235788 A1 | 12/2018 |

OTHER PUBLICATIONS

Japan Office Action issued in JP Application No. 2019-194980, dated Jul. 4, 2023.
International Search Report issued in International Pat. Appl. No. PCT/JP2020/031604, dated Oct. 20, 2020, with English translation.
International Preliminary Report on Patentability issued in International Pat. Appl. No. PCT/JP2020/031604, dated Oct. 27, 2021, with English translation.
Japan Office Action issued in JP Application No. 2019-194890, dated Jul. 4, 2023.

* cited by examiner

FIXING STRUCTURE OF WIRING MEMBER, AND WIRING MEMBER WITH HEAT GENERATION LAYER

TECHNICAL FIELD

The present disclosure relates to a fixing structure of a wiring member and a wiring member with a heat generation layer.

BACKGROUND ART

Patent Document 1 discloses a technique of attaching and fixing a wire harness to a molded ceiling by a double-sided adhesive tape.

PRIOR ART DOCUMENTS

Patent Documents

Patent Document 1: Japanese Patent Application Laid-Open No. 2000-264137

SUMMARY

Problem to be Solved by the Invention

In a case of Patent Document 1, there is a possibility that a dust, for example, adheres to a double-sided adhesive tape attached to a molded ceiling and tacky adhesion decreases. In order to prevent such a decrease in tacky adhesion, it is necessary to provide a releasing paper on the double-sided adhesive tape attached to the molded ceiling, or provide the double-sided adhesive tape on the molded ceiling and immediately attach the wire harness. In the former case, a process of removing the releasing paper at the time of attaching the wire harness is necessary. The latter case may cause a limitation in an assembly process.

Accordingly, an object is to provide a technique of achieving a simple fixation of a wiring member and an adherend.

Means to Solve the Problem

A fixing structure of a wiring member according to the present disclosure includes: a wiring member including at least one wire-like transmission member; a heat generation layer provided to surround a periphery of the wiring member; an adherend to which the wiring member is fixed; and a joint layer provided on at least a portion between the heat generation layer and the adherend and a portion between the heat generation layer and the wiring member, wherein the heat generation layer is a layer which can generate heat by induction heating, and the joint layer is a layer having bond properties when heat is transmitted from the heat generation layer at a time of induction heating, and is joined to the heat generation layer and at least one of the adherend and the wiring member.

Effects of the Invention

According to the present disclosure, the wiring member and the adherend are simply fixed to each other.

DESCRIPTION OF EMBODIMENT(S)

Description of Embodiment of Present Disclosure

Figure 1:
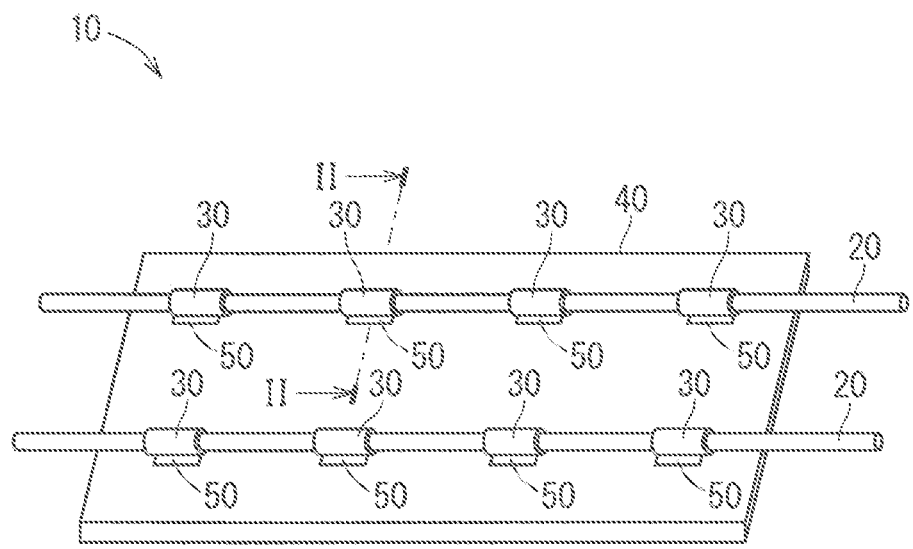
FIG. 1 is a perspective view illustrating a fixing structure of a wiring member according to an embodiment.

Embodiments of the present disclosure are listed and described firstly.

A fixing structure of a wiring member according to the present disclosure is as follows.

(1) A fixing structure of a wiring member includes: a wiring member including at least one wire-like transmission member; a heat generation layer provided to surround a periphery of the wiring member; an adherend to which the wiring member is fixed; and a joint layer provided on at least a portion between the heat generation layer and the adherend and a portion between the heat generation layer and the wiring member, wherein the heat generation layer is a layer which can generate heat by induction beating, and the joint layer is a layer having bond properties when heat is transmitted from the heat generation layer at a time of induction heating, and is joined to the heat generation layer and at least one of the adherend and the wiring member. The wiring member is fixed to the adherend via the joint layer. The joint layer has bond properties when induction heating is performed using the heat generation layer. The joint layer does not need a releasing paper but has the bond properties when heat is applied at an optional time. Accordingly, the wire-like transmission member and the adherend are simply fixed to each other.

(2) The joint layer may include an adherend side joint layer provided between the heat generation layer and the adherend to be joined to the heat generation layer and the adherend. Accordingly, the heat generation layer is fixed to the adherend by the adherend side joint layer.

(3) The adherend side joint layer may be provided to surround a periphery of the heat generation layer. The adherend side joint layer is provided to surround the periphery of the heat generation layer, thus an optional portion of the wiring member along a circumferential direction is easily fixed to the adherend.

(4) The joint layer may include a wiring member side joint layer provided between the heat generation layer and the wiring member to be joined to the heat generation layer and the wiring member. Accordingly, the heat generation layer is fixed to the wiring member by the wiring member side joint layer.

(5) The heat generation layer may be partially provided along a longitudinal direction of the wiring member. The region where the heat generation layer is provided is reduced, thus weight saving and cost reduction can be achieved, for example.

(6) A wiring member with a heat generation layer according to the present disclosure is a wiring member with a heat generation layer including: a wiring member including at least one wire-like transmission member; and a heat generation layer provided to surround a periphery of the wiring member, wherein the heat generation layer is a layer which can generate heat by induction heating. The heat generation layer is induction heated in a state where the wiring member with the heat generation layer is wired on the adherend and the joint layer is located between the heat generation layer and the adherend, and the joint layer thereby has bond properties and is joined to the heat generation layer and the adherend. Accordingly, the wiring member with the heat generation layer and the adherend are simply fixed each other.

Details of Embodiment of Present Disclosure

Specific examples of a fixing structure of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
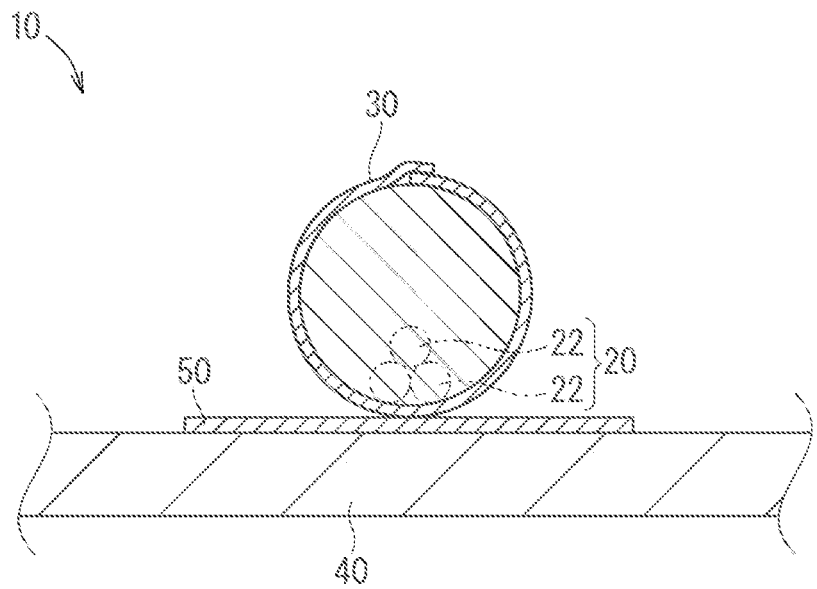
FIG. 2 is a cross-sectional view along a II-II line in FIG. 1.

A fixing structure of a wiring member according to an embodiment 1 is described hereinafter. FIG. 1 is a perspective view illustrating a fixing structure 10 of a wiring member according to the embodiment 1. FIG. 2 is a cross-sectional view along a II-II line in FIG. 1.

The fixing structure 10 of the wiring member includes a wiring member 20, a heat generation layer 30, an adherend 40, and a joint layer 50.

The wiring member 20 is mounted to a vehicle. The wiring member 20 is a wiring transmitting electrical power or light, for example, to each component provided in the vehicle. The plurality of (two in the example illustrated in FIG. 1) wiring members 20 are provided, however, the number thereof may be one. The wiring member 20 is linearly disposed on the adherend 40. The wiring member 20 may be curved and disposed on the adherend 40. The wiring member 20 is not branched on the adherend 40. The wiring member 20 may be branched on the adherend 40. The plurality of wiring members 20 are parallel to each other on the adherend 40. The plurality of wiring members 20 may not be parallel to each other on the adherend 40. Each wiring member 20 includes at least one wire-like transmission member 22.

The wire-like transmission member 22 may be a wire-like member transmitting electrical power or light, for example. The wire-like transmission member 22 includes a transmission wire body transmitting electrical power or light, for example. The wire-like transmission member 22 may include a covering layer covering the transmission wire body. For example, the wire-like transmission member 22 may be a covering wire, a bare conductive wire, a shielded wire, a twisted wire, an enamel wire, a nichrome wire, or an optical fiber.

Herein, each wiring member 20 includes a plurality of wire-like transmission members 22. The wiring member 20 may include an exterior member. The exterior member is a member covering the plurality of wire-like transmission members 22. The external member may be a sheet. The sheet is a member wound around the plurality of wire-like transmission members 22, for example. The exterior member may be a tube or a protector, for example. The tube or a protector is a member housing the plurality of wire-like transmission members 22. The external member may be a banding member. The banding member is a member banding the plurality of wire-like transmission members 22. An adhesive tape or a banding band, for example, may be adopted as the banding member.

The heat generation layer 30 is a layer which can generate heat by induction heating. For example, the heat generation layer 30 is a conductive layer formed of a conductive foil such as an aluminum foil or a copper foil as a material. The induction heating is a heating method using electromagnetic induction. The heat generation layer 30 generates heat by the induction heating as described hereinafter. That is to say, the induction heating generates change of magnetic field passing through the heat generation layer 30. For example, high frequency current flows in a circuit different from the heat generation layer 30 in a position located away from the heat generation layer 30, thus the change of the magnetic field passing through the heat generation layer 30 is generated. Induction current (eddy current) flows in the heat generation layer 30 by the change of the magnetic field passing through the heat generation layer 30. Joule heat is generated in the heat generation layer 30 in accordance with the induction current. The heat generation layer 30 generates heat by the Joule heat.

The heat generation layer 30 is provided to surround the periphery of the wiring member 20. In the example illustrated in FIG. 2, the heat generation layer 30 is wound around the wiring member 20 for one round. A region where the heat generation layer 30 is wound around the wiring member 20 is not particularly limited. The heat generation layer 30 may be wound around the wiring member 20 for less than one round (for example, quarter round or half round) or more than one round. One round, half round, and quarter round do not mean one round, half round, and quarter round in a strict sense, but have a meaning with a wide range in which an effect of the present disclosure is achieved within a range considered one round, half round, and quarter round. For example, in the example illustrated in FIG. 2, the heat generation layer 30 is wound around the wiring member 20 for slightly more than one round, and it can be considered that this state also indicates that the heat generation layer 30 is wound around the wiring member 20 for one round.

The heat generation layer 30 is partially provided along a longitudinal direction of the wiring member 20. The heat generation layer 30 is provided to overlap with part of a portion of the wiring member 20 wired on the adherend 40. The heat generation layer 30 is provided in a plurality of positions (herein, four positions) at intervals along the longitudinal direction in the wiring member 20.

The adherend 40 is a member provided in a vehicle. The adherend 40 may be an interior member such as a roof trim or a door trim. The adherend 40 may be a body part constituting a framework of a vehicle body. The adherend 40 may be a body panel such as a roof panel or a door panel. The wiring member 20 is fixed to a fixation surface of the adherend 40. Herein, the fixation surface of the adherend 40 is a planar surface, however, a curved surface may also be applicable. The fixation surface of the adherend 40 may be made of resin or metal. The wiring member 20 is fixed to the adherend 40.

The joint layer 50 is used for fixing the adherend 40 and the wiring member 20. The joint layer 50 is a layer having the bond properties when heat is transmitted from the heat generation layer 30 at a time of induction heating. The joint layer 50 is provided on at least a portion between the heat generation layer 30 and the adherend 40 and a portion between the heat generation layer 30 and the wiring member 20. The joint layer 50 is joined to the heat generation layer 30. The joint layer 50 is joined to at least one of the adherend 40 and the wiring member 20. Herein, the joint layer 50 is provided between the heat generation layer 30 and the adherend 40. The joint layer 50 is joined to the heat generation layer 30 and the adherend 40. The joint layer 50 provided between the heat generation layer 30 and the adherend 40 is the adherend side joint layer 50. In the present example, the joint layer 50 extends on the adherend 40.

For example, the joint layer 50 may be a layer which is melt by heat transmitted from the heat generation layer 30 at the time of the induction heating and can be joined. In this case, thermoplastic resin may be a material of the joint layer 50. The joint layer 50 may be a hot-melt adhesive agent. Moreover, for example, the joint layer 50 may also be a thermoset adhesive agent. The joint layer 50 may be formed so that a surface thereof is not sticky as much as possible at room temperature. It is preferable that a releasing paper is unnecessary in the joint layer 50.

In the example illustrated in FIG. 2, an exterior member having a planar surface is not provided in a portion of the wiring member 20 provided with the heat generation layer 30. The wiring member 20 and the adherend 40 do not have surface contact with each other in a portion of the wiring member 20 fixed to the adherend 40 via the joint layer 50. The exterior member having the planar surface may be provided in the portion of the wiring member 20 provided with the heat generation layer 30. The wiring member 20 and the adherend 40 may have surface contact with each other in the portion of the wiring member 20 fixed to the adherend 40 via the joint layer 50.

Figure 3:
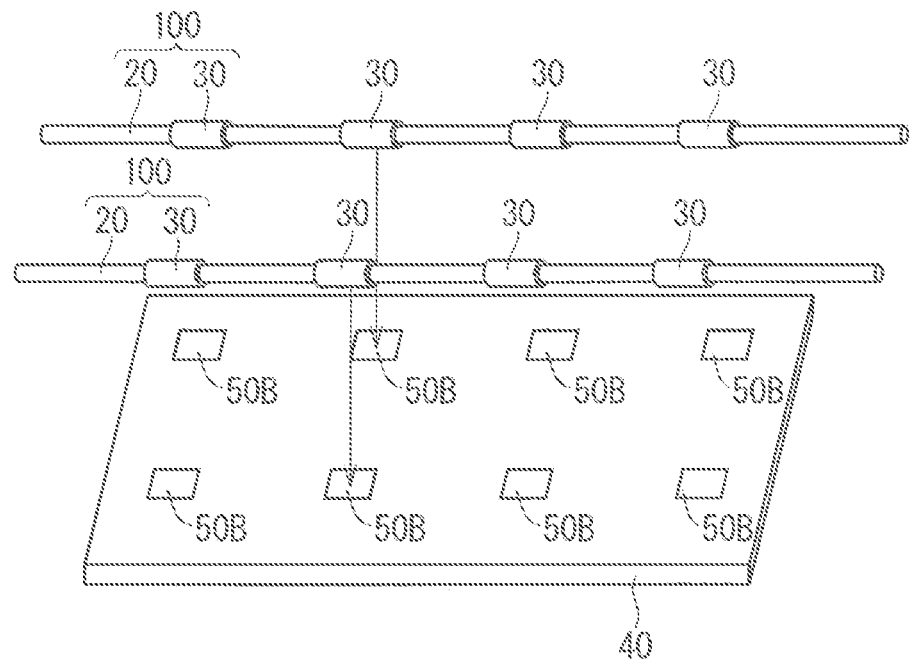
FIG. 3 is an explanation diagram illustrating the wiring member fixed to the adherend.

FIG. 3 is an explanation diagram illustrating the wiring member 20 fixed to the adherend 40.

In the example illustrated in FIG. 3, the heat generation layer 30 is fixed to the wiring member 20 before being fixed to the adherend 40. A fixing state of fixing the wiring member 20 and the heat generation layer 30 is not particularly limited. For example, it is also applicable that a single-sided adhesive tape is wound around an end portion of the heat generation layer 30 along the longitudinal direction of the wiring member 20 and the wiring member 20 extending from the end portion to fix the heat generation layer 30 to the wiring member 20. For example, a banding member such as a single-sided adhesive tape or a banding band may be wound around the heat generation layer 30 to bundle and fix the heat generation layer 30 and the wiring member 20. For example, the heat generation layer 30 may be fixed to the wiring member 20 by an adhesive agent or a pressure sensitive adhesive agent provided between the heat generation layer 30 and the wiring member 20. The wiring member 20 provided with the heat generation layer 30 may be referred to as the wiring member with the heat generation layer 100. The wiring member with the heat generation layer 100 includes the wiring member 20 and the heat generation layer 30 provided to surround the periphery of the wiring member 20.

The wiring member with the heat generation layer 100 is wired on the adherend 40. At this time, a joint layer 50B is provided between the heat generation layer 30 and the adherend 40. The joint layer 50B is in a state before being fixed to a fixing target (at least one of the heat generation layer 30 and the adherend 40 herein). A configuration similar to that of the joint layer 50 described above can be adopted to the joint layer 50B except that the joint layer 50B is not fixed to the fixing target (at least one of the heat generation layer 30 and the adherend 40 herein). The joint layer 50B has bond properties when induction heating is performed by the heat generation layer 30. Accordingly, the joint layer 50 having the bond properties is joined to both the heat generation layer 30 and the adherend 40, and the wiring member 20 is fixed to the adherend 40. The joint layer SOB may be joined to the heat generation layer 30 in advance before being joined to both the conductive layer and the adherend 40, may also be joined to the adherend 40 in advance, or may not be joined to any of them.

According to the fixing structure 10 of the wiring member having the configuration described above, the wiring member 20 is fixed to the adherend 40 via the joint layer 50. The joint layer 50 has the bond properties when induction heating is performed using the heat generation layer 30. The joint layer 50 does not need a releasing paper but has the bond properties when heat is applied at an optional time. Accordingly, the wiring member 20 and the adherend 40 are simply fixed to each other.

The heat generation layer 30 is fixed to the adherend 40 by the adherend side joint layer 50.

The heat generation layer 30 is partially provided along the longitudinal direction of the wiring member 20, thus the region where the heat generation layer 30 is provided is reduced, and weight saving and cost reduction can be achieved, for example.

According to the wiring member with the heat generation layer 100, the heat generation layer 30 is induction heated in a state where the wiring member with the heat generation layer 100 is wired on the adherend 40 and the joint layer 50B is located between the heat generation layer 30 and the adherend 40, thus the joint layer 50B has the bond properties and is joined to the heat generation layer 30 and the adherend 40. Accordingly, the wiring member 20 and the adherend 40 are simply fixed to each other.

Embodiment 2

Figure 4:
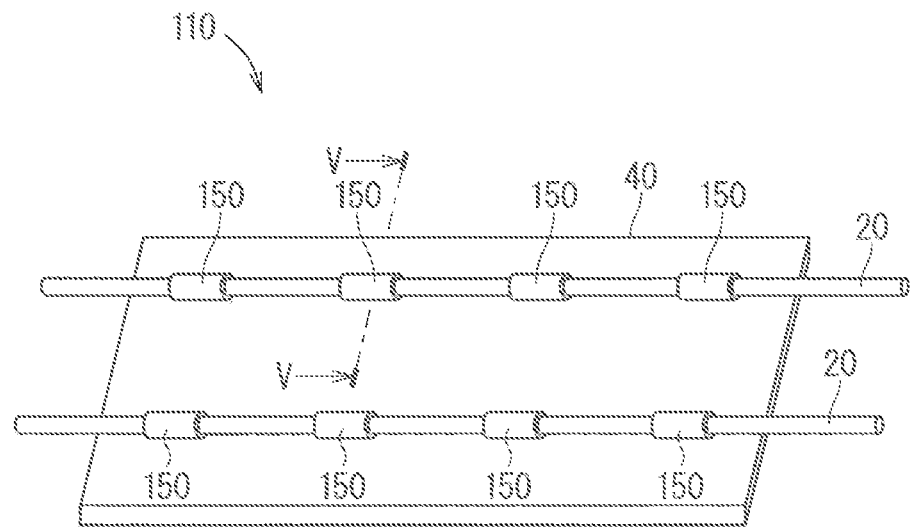
FIG. 4 is a perspective view illustrating a fixing structure of a wiring member according to an embodiment 2.
Figure 5:
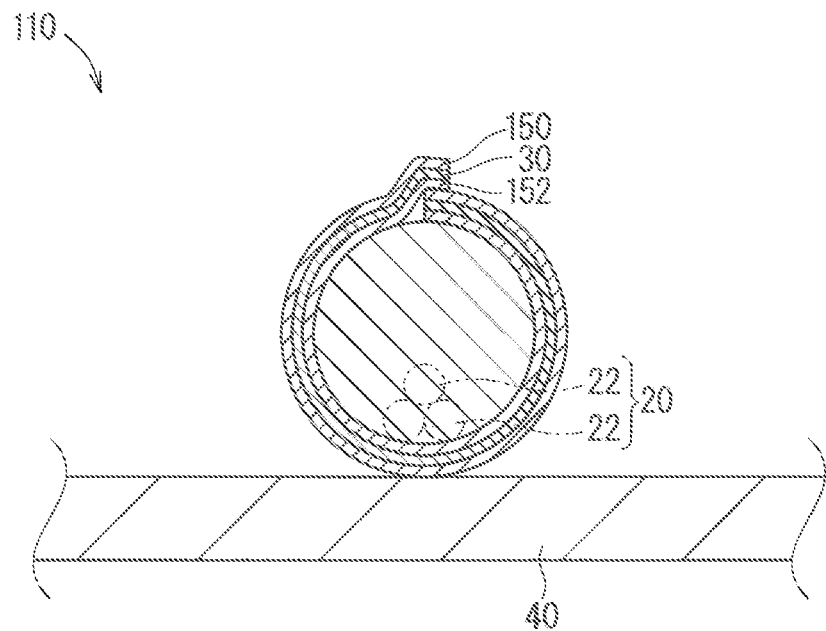
FIG. 5 is a cross-sectional view along a V-V line in FIG. 4.

A fixing structure of a wiring member according to an embodiment 2 is described. FIG. 4 is a perspective view illustrating a fixing structure 110 of the wiring member according to the embodiment 2. FIG. 5 is a cross-sectional view along a V-V line in FIG. 4. In the following description of the present embodiment, the same reference numerals are assigned to the similar constituent elements described above, and the description thereof will be omitted.

In the fixing structure 110 of the wiring member, a shape of a joint layer 150 is different from that of the joint layer 50 in the fixing structure 10 of the wiring member. The joint layer 150 is the adherend side joint layer 150. The joint layer 150 is provided to surround the periphery of the heat generation layer 30. The joint layer 150 is curved along a circumferential direction of the wiring member 20. The joint layer 150 surrounds a whole periphery of the wiring member 20. Only a part of the joint layer 150 in the circumferential direction is joined to the adherend 40. The joint layer 150 covers a whole heat generation layer 30. The joint layer 150 may cover only a part of the heat generation layer 30.

A joint layer 152 is provided between the heat generation layer 30 and the wiring member 20 in the fixing structure 110 of the wiring member. The joint layer 152 is joined to the heat generation layer 30 and the wiring member 20. Accordingly, the heat generation layer 30 is fixed to the wiring member 20. The joint layer 152 is the wiring member side joint layer 152. The joint layer 152 covers the whole heat generation layer 30. The joint layer 152 may cover only a part of the heat generation layer 30.

The joint layer 150 is provided on a side of one main surface of the heat generation layer 30. The joint layer 152 is provided on a side of the other main surface of the heat generation layer 30. Thus, the heat generation layer 30 can be also considered a base material of the joint layers 150 and 152.

Figure 6:
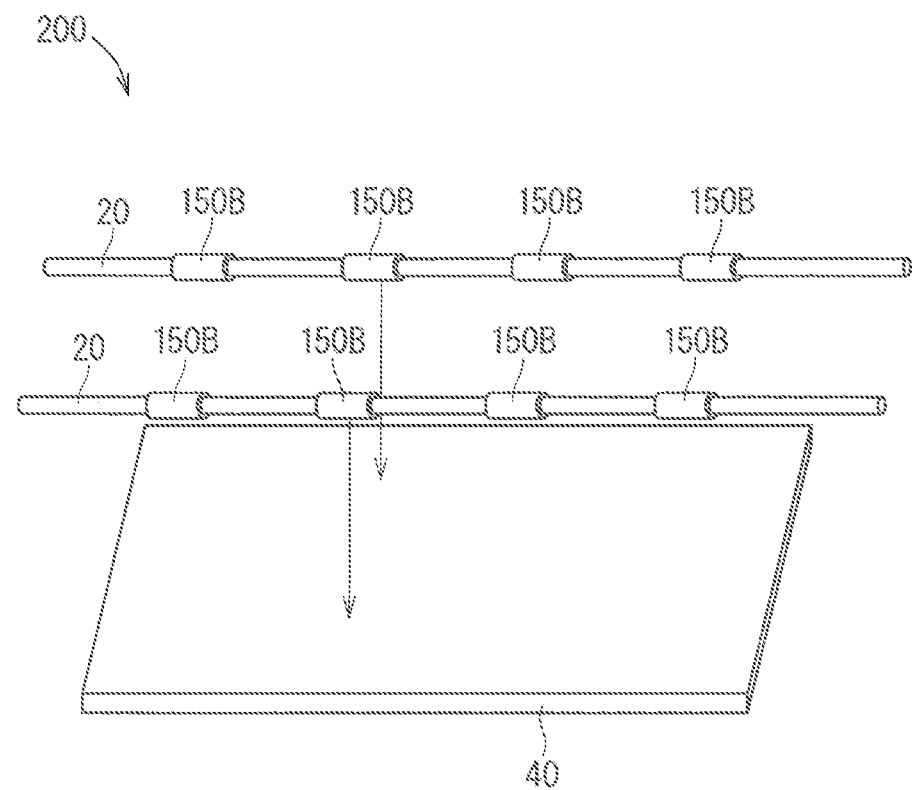
FIG. 6 is an explanation diagram illustrating the wiring member fixed to the adherend.

FIG. 6 is an explanation diagram illustrating the wiring member 20 fixed to the adherend 40.

In the example illustrated in FIG. 6, the joint layer 150B is fixed to the wiring member 20 before the wiring member 20 is fixed to the adherend 40. The joint layer 150B is in a state where the joint layer 150 is fixed to the adherend 40. The joint layer 150B is fixed to the wiring member 20 together with the heat generation layer 30. Accordingly, a wiring member with a heat generation layer 200 further includes a joint layer 150B. The joint layer 150B is exposed. The laminated joint layer 150B and heat generation layer 30 may also be referred to as a joint member. It can also be considered that the joint member is provided in the wiring member 20. A fixing state similar to that of the heat generation layer 30 and the wiring member 20 in the embodiment 1 can be adopted to a fixing state of the joint member and the wiring member 20.

At this time, the joint layer 152 is also fixed to the wiring member 20 before the wiring member 20 is fixed to the adherend 40. The joint layer 152 is fixed to the wiring member 20 together with the heat generation layer 30. Accordingly, the wiring member with the heat generation layer 200 further includes the joint layer 152. The joint layer 152 may also be formed on the joint member before being fixed to the wiring member 20. The joint member may be made up of the heat generation layer 30 with the joint layer 150B and the joint layer 152 before being joined formed on both surfaces thereof.

The joint layer 150B has the bond properties when the wiring member with the heat generation layer 200 is wired along a predetermined route on the adherend 40 and the heat generation layer 30 is induction heated. Accordingly, the joint layer 150 thereby having the joint properties is joined to the adherend 40 and fixed. With respect to the wiring of the wiring member with the heat generation layer 200 and induction heating of the heat generation layer 30, the wiring may be performed firstly, induction heating may be performed firstly, or they may be performed at the same time.

According to the fixing structure 110 of the wiring member having the configuration described above, the joint layer 150 is provided to surround an outer periphery of the heat generation layer 30, thus an optional portion of the wiring member 20 along the circumferential direction is easily fixed to the adherend 40.

The heat generation layer 30 is fixed to the wiring member 20 by the joint layer 152.

Modification Example

In each embodiment, the joint layers 50 and 150 are provided between the heat generation layer 30 and the adherend 40, however, this configuration is not necessary. Also applicable is a configuration that the joint layers 50 and 150 are not provided between the heat generation layer 30 and the adherend 40 but the joint layer 152 is provided between the heat generation layer 30 and the wiring member 20.

The configurations described in the embodiments and modification examples thereof can be appropriately combined as long as they are not contradictory.

EXPLANATION OF REFERENCE SIGNS 10, 110 fixing structure of wiring member
20 wiring member
22 wire-like transmission member
30 heat generation layer
40 adherend
50, 50B joint layer (adherend side joint layer)
150, 150B joint layer (adherend side joint layer)
152 joint layer (wiring member side joint layer)
100, 200 wiring member with heat generation layer

The invention claimed is:

1. A fixing structure of a wiring member, comprising:
a wiring member including at least one wire-like transmission member;
a heat generation layer provided to surround a periphery of the wiring member;
an adherend to which the wiring member is fixed; and
a joint layer provided on at least a portion between the heat generation layer and the adherend and a portion between the heat generation layer and the wiring member, wherein
the heat generation layer is a layer which can generate heat by induction heating,
the joint layer is a layer having bond properties when heat is transmitted from the heat generation layer at a time of induction heating, and is joined to the heat generation layer and at least one of the adherend and the wiring member,
the joint layer includes an adherend side joint layer provided between the heat generation layer and the adherend to be joined to the heat generation layer and the adherend, and
a fixation surface of the adherend is a planar surface, and the adherend side joint layer is provided to extend along the fixation surface.

2. The fixing structure of the wiring member according to claim 1, wherein
the joint layer includes a wiring member side joint layer provided between the heat generation layer and the wiring member to be joined to the heat generation layer and the wiring member.

3. The fixing structure of the wiring member according to claim 1, wherein
the heat generation layer is partially provided along a longitudinal direction of the wiring member.

4. A wiring member with a heat generation layer, comprising:
a wiring member including at least one wire-like transmission member; and
a heat generation layer provided to surround a periphery of the wiring member, wherein
the heat generation layer is a layer which can generate heat by induction heating, and is an outermost layer in a periphery of the wiring member.

5. A fixing structure of a wiring member, comprising:
a wiring member including at least one wire-like transmission member;
a heat generation layer provided to surround a periphery of the wiring member;
an adherend to which the wiring member is fixed; and
a joint layer provided on at least a portion between the heat generation layer and the adherend and a portion between the heat generation layer and the wiring member, wherein
the heat generation layer is a layer which can generate heat by induction heating, the joint layer is a layer having bond properties when heat is transmitted from the heat generation layer at a time of induction heating, and is joined to the heat generation layer and at least one of the adherend and the wiring member, the joint layer includes an adherend side joint layer provided between the heat generation layer and the adherend to be joined to the heat generation layer and the adherend, and a part of the heat generation layer along a circumferential direction of the wiring member is joined to the adherend side joint layer, and another part of the heat generation layer which is not joined to the adherend side joint layer along the circumferential direction of the wiring member is exposed.

6. A fixing structure of a wiring member, comprising:

a wiring member including at least one wire-like transmission member;

a heat generation layer provided to surround a periphery of the wiring member;

an adherend to which the wiring member is fixed; and a joint layer provided on at least a portion between the heat generation layer and the adherend and a portion between the heat generation layer and the wiring member, wherein the heat generation layer is a layer which can generate heat by induction heating, the joint layer is a layer having bond properties when heat is transmitted from the heat generation layer at a time of induction heating, and is joined to the heat generation layer and at least one of the adherend and the wiring member, the joint layer includes an adherend side joint layer provided between the heat generation layer and the adherend to be joined to the heat generation layer and the adherend, a fixation surface of the adherend is a planar surface, and the adherend side joint layer is provided to extend along the fixation surface, and a part of the heat generation layer along a circumferential direction of the wiring member is joined to the adherend side joint layer, and another part of the heat generation layer which is not joined to the adherend side joint layer along the circumferential direction of the wiring member is exposed.

* * * * *